United States Patent
Ou et al.

(10) Patent No.: US 7,972,436 B2
(45) Date of Patent: *Jul. 5, 2011

(54) AIR MANAGEMENT IN CEMENTITIOUS MIXTURES HAVING PLASTICIZER AND A CLAY-ACTIVITY MODIFYING AGENT

(75) Inventors: Chia-Chih Ou, Lexington, MA (US); Ara A. Jeknavorian, Chelmsford, MA (US); Christon L. Hill, Washington, DC (US)

(73) Assignee: W. R. Grace & Co.-Conn., Columbia, MD (US)

( * ) Notice: Subject to any disclaimer, the term of this patent is extended or adjusted under 35 U.S.C. 154(b) by 2535 days.

This patent is subject to a terminal disclaimer.

(21) Appl. No.: 10/267,631

(22) Filed: Jul. 8, 2002

(65) Prior Publication Data

US 2003/0136307 A1 Jul. 24, 2003

Related U.S. Application Data

(62) Division of application No. 09/517,443, filed on Mar. 2, 2000, now Pat. No. 6,441,054.

(51) Int. Cl.
*C04B 24/12* (2006.01)
*C04B 24/18* (2006.01)

(52) U.S. Cl. ............................... 106/726; 106/728; 524/5

(58) Field of Classification Search .................... 516/11, 516/14, 15, 77, 912, 915; 106/664, 822, 106/823, 724, 726, 727; 522/130; 524/5
See application file for complete search history.

(56) References Cited

U.S. PATENT DOCUMENTS

| | | | |
|---|---|---|---|
| 4,116,706 | A | 9/1978 | Previte |
| 4,814,014 | A | 3/1989 | Arfaei |
| 4,960,465 | A | 10/1990 | Arfaei |
| 5,016,711 | A | 5/1991 | Cowan |
| 5,478,521 | A | 12/1995 | Scheiner |
| 5,634,966 | A | 6/1997 | Berke et al. |
| 5,641,352 | A | 6/1997 | Jeknavorian |
| 5,679,150 | A | 10/1997 | Kerkar et al. |

(Continued)

FOREIGN PATENT DOCUMENTS

GB 2343448 A 5/2000

(Continued)

OTHER PUBLICATIONS

BASF Pluronic & Tetronic Surfactants, 1-28 pgs. 1989.
Gutmann, P.: "Bubble Characteristics as They Pertain to Compressive Strength and Freeze-Thaw Durability", ACI Materials Journal, vol. 85, No. 5, 1988, pp. 361-366.

(Continued)

*Primary Examiner* — Paul Marcantoni
(74) *Attorney, Agent, or Firm* — Craig K. Leon; Stephan P. Williams

(57) ABSTRACT

An exemplary surface active agent admixture composition of the invention comprises (1) a first surface active agent comprising a betaine, an alkyl or aryl or alkylaryl sulfonate, or mixture thereof; and (2) a second surface active agent comprising a nonionic oxyalkylene-containing polymer surfactant. The present invention therefore provides a system for ensuring the presence in a hydratable cementitious composition (when hardened) a sufficient air volume and sufficient air void fineness and consistency. Further exemplary admixture compositions may comprise one or more plasticizers and one or more clay activity-modifying agents. Cementitious compositions and methods for modifying cementitious compositions, which incorporate the above-mentioned surface active agent combination, are also described. The invention provides the ability to adjust and stabilize air void systems in hydratable cementitious compositions, while allowing conventional air entraining agent (AEA) dosage practices to be followed.

21 Claims, 2 Drawing Sheets

U.S. PATENT DOCUMENTS

| | | | |
|---|---|---|---|
| 5,703,174 A | 12/1997 | Arfaei et al. | |
| 5,743,841 A | 4/1998 | Block et al. | |
| 5,782,972 A | 7/1998 | Abelleira et al. | |
| 6,441,054 B1 * | 8/2002 | Ou et al. ......................... | 516/11 |

FOREIGN PATENT DOCUMENTS

| | | |
|---|---|---|
| WO | 9700898 A | 1/1997 |
| WO | 9858887 A | 12/1998 |
| WO | 9965841 A | 12/1999 |

OTHER PUBLICATIONS

Buscher, Supplemental European Search Report, European patent application No. EP 01912754, Aug. 26, 2009, 4 pp.

Buscher, European Examination Report, European patent application No. EP 01912754, Jun. 14, 2010, 7 pp.

Buscher, European Examination Report, European patent application No. EP 01912754, Mar. 24, 2011, 6 pp.

* cited by examiner

AIR MANAGEMENT IN CEMENTITIOUS MIXTURES HAVING PLASTICIZER AND A CLAY-ACTIVITY MODIFYING AGENT

This is a divisional based on Ser. No. 09/517,433 filed Mar. 2, 2000, now U.S. Pat. No. 6,441,054.

FIELD OF THE INVENTION

The invention relates to a novel combination of surface active agents for adjusting and stabilizing air voids in hydratable cementitious compositions.

BACKGROUND OF THE INVENTION

As used herein, the term "concrete" means and refers to a mixture of a hydratable cementitious binder (e.g., Portland cement), fine aggregate (sand), and coarse aggregate (crushed stone or gravel) to which water is added to provide a composition that can harden into a building structure (e.g., foundation) or a civil engineering structure (e.g., tunnel) or other structural component.

In World Patent Application No. PCT/US98/12876, which is incorporated by reference herein, Jardine et al. disclosed that oxyalkylene-containing polymer additives, used as plasticizing or water-reducing admixtures in concrete, sometimes had unpredictable dosage behavior in different concrete mixes. Jardine et al. found that the aggregates contained in some concrete mixes had certain swellable clays (e.g., smectites) that negatively interacted with the plasticizer to create poor dosage response. It was theorized that such clays expanded when initially wetted by the mix water, and, in the expanded state, absorbed or entrapped the plasticizer. The invention of Jardine et al. was to employ clay-modifying agents. The purpose was to modify the clay activity, or mechanism, by which the clay-bearing aggregate interfered with the plasticizer activity, thereby to permit normal dosage of plasticizer to be used in the concrete.

The present inventors have discovered that, where an oxyalkylene-containing polyol polymer is used as the clay-modifying agent, the resultant concrete mix may have air entrainment problems, even when conventional air entraining agents ("AEAs") are used. One of the objectives of the present invention, therefore, is to improve the air entrainment capability and air void quality of concrete mixes that employ oxyalkylene plasticizers and clay activity modifying agents. Another objective, more generally, is to provide a surface active agent system that is believed to be useful for adjusting and stabilizing air void systems in cementitious compositions, without seriously impeding the ability to employ conventional AEAs and/or clay-activity-modifying agents.

Technically speaking, an AEA does not generate air in the concrete, but merely stabilizes air that is (1) infolded (or mechanically enveloped) during mixing; (2) dissolved in the mix water; and/or (3) present in the intergranular spaces in the dry cement and aggregate. The concept of "entrained" air voids is different from the concept of "entrapped" air voids. It is desirable (e.g., for purposes of increasing durability of hardened concrete under freeze-thaw conditions) to entrain air voids of a certain size (average diameter typically between 0.01-1.0 millimeter) and shape (generally spherical) in the paste portion of the wet concrete. Examples of common or conventional AEAs include water soluble salts (usually sodium) of wood resins, wood rosins, lignosulfonic acid, sulfonated hydrocarbons, proteinaceous materials, and fatty acids (e.g., tall oil fatty acid) and their esters.

The problem of controlling air void content and size distribution in concrete using AEAs is especially challenging when clay modifying agents, having a tendency to detrain intentionally entrained air, are present. When AEAs are added to concrete, they form a film at the interface between the air void and water phases, due to their varying solubility in the aqueous phase. (see e.g., "Air Entraining Admixtures," from *Concrete Admixtures*, Dr. Vance Dodson (Van Nostrand Reinhold, New York 1990), page 133-134). Furthermore, AEAs may be anionic, cationic, or nonionic in nature. Since common AEAs vary widely in composition and nature, a variation in their effectiveness might be expected. However, achieving consistency in managing the air content has been, for the most part, highly unpredictable.

SUMMARY OF THE INVENTION

The present invention pertains to a novel combination of surface active agents for adjusting and stabilizing the air void system in hydratable cementitious compositions such as concrete.

An exemplary surface active agent combination of the invention comprises (1) a first surface active agent, which is preferably employed in the amount of 0.0001-0.005% solids content by dry weight of the cement ("% s/s") to be treated and which is preferably air entraining in the cementitious composition, this first surface active agent comprising a betaine, an alkyl and/or alkylaryl sulfonate, or mixture thereof; and (2) a second surface active agent, preferably in the amount of 0.0001-0.005% (by weight of the cement to be treated), the second agent comprising a nonionic oxyalkylene-containing polymer surfactant. Preferably, the nonionic oxyalkylene-containing polymer is a block copolymer.

The present inventors have discovered that the first surface active agent dramatically increases the air content but does not necessarily provide a fine and uniform air void distribution in concrete and does not, due to its sensitivity in small dosages, allow for easily-controllable air void volumes. Its combination with the second surface active agent, which operates to detrain air and thus improves fineness as well as the uniformity of air void distribution, attains a novel and fine-tunable air void system in a concrete. Thus, an exemplary admixture composition of the invention for a hydratable cementitious composition comprises a plasticizer having polyoxyalkylene groups; at least one clay activity modifying agent; a first surface active agent operative to entrain air in a hydratable cementitious composition; and a second surface active agent operative to render the air voids entrained by the first surface active agent more uniform in size.

One of the advantages of this combination is that the surface active agents can be used in relatively small dosages that permit conventional air entraining agents (AEAs) to be incorporated into the concrete (or other cementitious compositions) at conventional dosages and using conventional practices. This is also what is meant by the "fine-tunability" in concrete as provided by the admixtures of the invention.

The above-described combination of surface active agents is particularly useful for adjusting and stabilizing air void systems in concretes manufactured with a plasticizer (e.g., such as one comprising oxyalkylene groups and/or polycarboxylic acid groups or their salts or esters), one or more clay-modifying agents (for decreasing the plasticizer-absorbing activity of clay contained in the aggregate), and a conventional AEA. Thus, a further exemplary admixture composition of the invention comprises, in addition to the above-described surface active agent combination, a plasticizer (e.g., one comprising oxyalkylene groups and/or polycarboxylic acids or their salts or esters), and a clay-activity modifying agent. Optionally, though less preferably, the exemplary admixture composition may further comprise a conventional AEA.

An exemplary concrete composition or structure of the invention comprises a cementitious binder and the two surface active agents described above. Accordingly, a concrete of the invention comprises a Portland cement; at least one aggregate comprising fine aggregate, coarse aggregate, or mixture thereof; and the admixture of claim 1; said concrete further comprising, after said cement, at least one aggregate, and said admixture have been combined with water and allowed to harden, a uniformly distributed air void system having (A) a spacing factor less than 0.008 inch as measured in accordance with ASTM C457-98, and (B) a specific surface greater than 600 (1/inch) as measured in accordance with ASTM C457-98.

The invention also provides cementitious compositions containing said exemplary admixture composition, as well as methods for controlling air in concrete. The methods involve combining said admixture composition into a cementitious mixture.

Moreover, it is further believed that the use of the aforementioned two surface active agents leads to improved or enhanced "finishability" (e.g., the ability of the cementitious composition to be placed, smoothed, with excess water removed using minimal effort) in the concrete composition. Accordingly, a method of the invention for improving finishability of a wet concrete or masonry cement is to incorporate, into a wet hydratable cementitious mixture, the two surface agents described above.

Other advantages and features of the invention are discussed in further detail hereinafter.

DETAILED DESCRIPTION OF THE PREFERRED EMBODIMENTS

Figure 1:
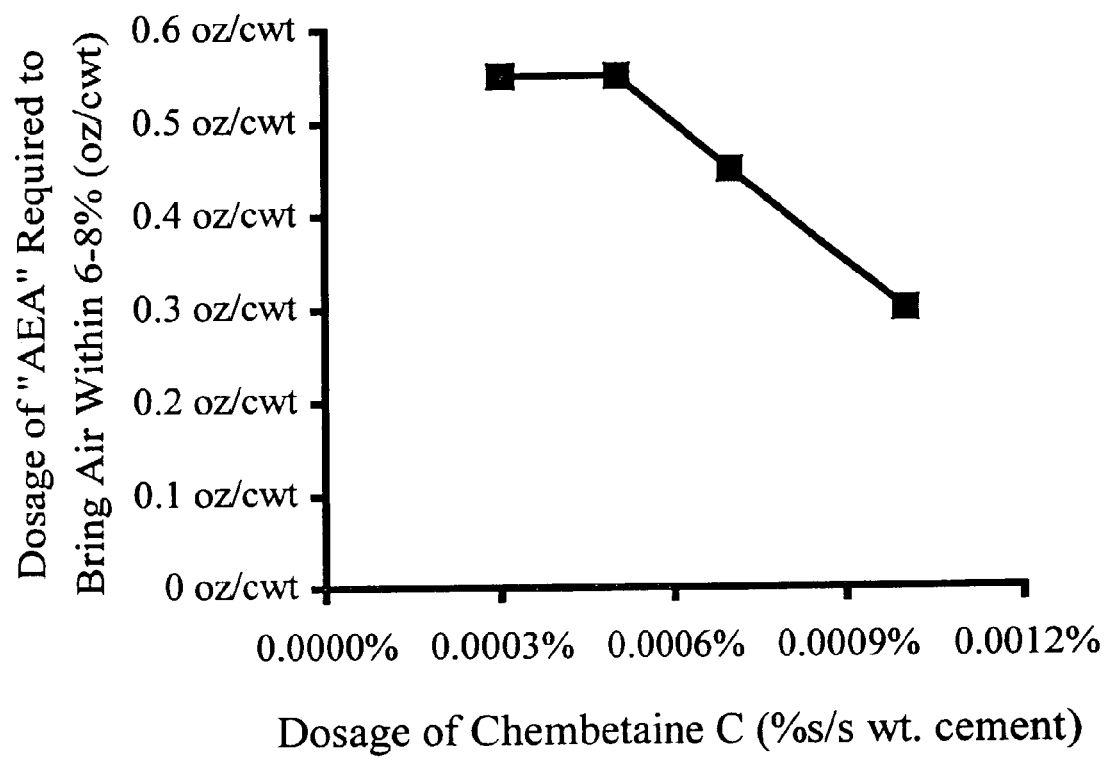
FIGS. 1 and 2 are graphic illustrations of test results as described, respectively, in Examples 3 and 4.

The present invention is directed to novel methods and admixture compositions for improving air void systems in concrete and other hydratable cementitious compositions.

The term "cementitious composition" as used herein refers to pastes, mortars, grouts such as oil well cementing grouts, and concrete compositions comprising a hydraulic cement binder. The terms "paste", "mortar" and "concrete" are terms of art: pastes are mixtures composed of a hydraulic cement binder (usually, but not exclusively, Portland cement, Masonry cement, or Mortar cement, and may also include limestone, hydrated lime, fly ash, blast furnace slag, pozzolans, silica fume, metakaolin, or other materials commonly included in such cements) and water; mortars are pastes additionally including fine aggregate, and concretes are mortars additionally including coarse aggregate. The cementitious compositions tested in this invention are formed by mixing required amounts of certain materials, e.g., a hydratable cement, water, and fine and/or coarse aggregate, as may be applicable to make the particular cement composition being formed.

The term "plasticizer," as used herein, refers to agents that allow concrete to be made with less water. These agents would thus include low and mid range water reducers, and also high range water reducers which are commonly referred to as "superplasticizers." The present invention is particularly suitable for use with so-called superplasticizers (i.e. agents that allow for relatively high (>12%) water reduction).

The present invention provides a surface active agent system that is useful, as mentioned above, for adjusting and stabilizing the air void system in hydratable cementitious compositions. By the term "adjusting," the present inventors refer to the ability of the surface active agents to ensure that the volume of air contained in the freshly made cementitious composition is within a suitable range, which for present purposes is 3-20 percent based on wet volume of the cementitious composition. By the term "stabilizing," the present inventors refer to the ability of the surface active agents to preserve the amount and distribution of fine air voids in the plastic cementitious material during mixing and subsequent handling and hardening. Thus, the present invention is especially useful for addressing air management problems which commonly occur in the manufacture of concretes and mortars.

In addition, the present invention has particular benefits when used with plasticizers for concretes having clay-bearing aggregates, because this situation involves particularly difficult air management problems. Certain clay-activity modifying agents used for lowering the plasticizer dosage requirement (which could otherwise be significantly increased by the presence of the absorptive clay) may alter the air-entraining properties of the cementitious composition, and otherwise complicate air management practices due to side effects. The term "clay" as used in the present invention specifically concerns swelling, absorbing clays often labeled as smectites, montmorillonite, illite, hectorite, or the commercially available clay known as "Bentonite." It is also contemplated that volcanic ash and amorphous clays are also included in the absorptive type materials to be considered within the definition of "clay." The problematic clays (e.g., smectite) are present in certain sands, and this is believed to cause many plasticizer dosage problems.

Accordingly, the present invention provides admixture compositions (comprising the two surface active agents described above, optionally with a plasticizer and a clay-activity modifying agent); cementitious compositions containing the exemplary admixture composition; and methods for controlling the amount and distribution of air voids in cementitious compositions (and in particular those admixed with the admixture composition).

An exemplary surface active agent combination of the present invention therefore comprises (1) an air-entraining surface active agent comprising a betaine, alkyl and/or alkylaryl sulfonate, or mixture thereof; and (2) a nonionic oxyalkylene-containing polymer surfactant.

A further exemplary admixture composition of the present invention comprises, in addition to the two surface active agents mentioned above, a plasticizer having oxyalkylene groups, polycarboxylic groups (or their salts or esters), or a mixture thereof; and a clay-activity-modifying agent. Optionally, a conventional air entraining agent (AEA) can be used or such an AEA can optionally be added separately into the concrete, cement, or cementitious composition being treated.

Hence, the admixture composition is incorporated into a hydratable cementitious composition, such as concrete or cement mortar, which optionally can contain a conventional air entraining agent (AEA) such as a water soluble salt (usually sodium) of a wood resin, wood rosin, or gum rosin; a non-ionic surfactant (e.g., such as those commercially available from BASF under the tradename TRITON X-100); a sulfonated hydrocarbon; a proteinaceous material; or a fatty acid (e.g., tall oil fatty acid) or its ester. The term "AEA" is used herein to mean and refer to a conventional air entraining agent, such as but not limited to one that has been identified above, but this term does not include components identified by the present inventors as being components "1" and "2" of the surface active agent combination previously described. The management of air void systems in concretes and mortars containing one or more plasticizers, one or more clay-activity modifying agents, and optionally one or more conventional AEA, is achieved in the present invention by using the novel surface active agent combination described above.

The novel surface active agent combination, as described above, is believed to be suitable for use with conventional plasticizers (including superplasticizers) such as lignosulfonates, naphthalene sulfonates, melamine sulfonates, etc. In particular, the surface active agent combination of the present invention is useful in combinations involving plasticizers having oxyalkylene groups, polycarboxylic acid groups (or their salts or esters), or mixtures thereof. Oxyalkylene-containing plasticizers are sometimes called "EO/PO" type plasticizers (the letters "EO/PO" refer to ethylene oxide and propylene oxide repeating groups). Incidentally, the term "alkylene" is meant herein to encompass linear or branched alkyl(ene) groups, and also to include (where structurally possible) aryl(ene) and arylalkyl(ene) groups. An EO/PO plasticizer is taught for example in U.S. Pat. No. 5,393,343 of Darwin et al., incorporated herein by reference. Darwin et al. disclosed an EO/PO type comb polymer useful as a plasticizer or water-reducer for retaining in concrete a high degree of slump (e.g., high flowability) over a sustained period of time. As used herein, the term "EO/PO" is synonymous with the term "oxyalkylene group" and serves as a convenient short-hand to designate polyoxyalkylene groups (e.g., ethylene oxide/propylene oxide copolymers). Thus, for present purposes, the term "EO/PO type comb polymer" means and refers to a polymer having a backbone such as a carbon backbone to which are attached both carboxylate groups (which function as cement anchoring groups in the cementitious mixture) and pendant groups such as ethylene oxide (EO) groups, propylene oxide (PO) groups, and/or a combination of EO/PO groups. The pendant groups may be ionic or non-ionic.

Further examples of EO/PO polymer plasticizers are shown in U.S. Pat. Nos. 4,946,904, 4,471,100, 5,100,984 and 5,369,198, also incorporated by reference herein. These patents describe comb polymers which are, for example, copolymers of polycarboxylic monomers such as maleic acid or anhydride and polymerizable EO/PO—containing monomers such as polyalkylene glycol monoallyl ethers, etc.

Commercially available plasticizers having EO/PO groups and polycarboxylic groups are sold by Grace Construction Products, Cambridge, Mass., under the trademark "ADVA®." The ADVA® comb polymer is a polyacrylic acid polymer made by grafting a polyoxyalkylene amine onto a polycarboxylic acid backbone (amidization/imidization reaction). This commercially available plasticizer is suitable for purposes of the present invention.

Another commercially available plasticizer, one having primarily EO groups and polycarboxylic groups, is sold by SKW under the commercial name "GLENIUM." Accordingly, plasticizers having primarily EO groups are believed suitable for use in the present invention as well.

Another comb polymer (containing polyoxyalkylene groups) believed to be suitable for use in the present invention is the type obtained by polymerization of maleic anhydride and an ethylenically-polymerizable polyalkylene, as prepared in U.S. Pat. No. 4,471,100, the entire disclosure of which is incorporated herein by reference. This product is sold commercially under the tradename "MALIALIM". This commercial product is typically sold in the form of a salt formed by final reaction of the polymers with a base such as sodium or calcium hydroxide.

Other plasticizers which are believed suitable for use with the novel surface active agent combination described above include those disclosed by ARCO Chemical Technology, L. P., for example, in U.S. Pat. Nos. 5,670,578; 5,725,654; and 5,854,386, which are incorporated herein by reference. These are oxyalkylene containing polymers.

Thus, preferred plasticizers for use in the invention have oxyalkylene groups and/or polycarboxylic groups (or their salts); and especially preferred are comb-type polymers that comprise a carbon-containing backbone and pendant groups comprising oxyalkylene and/or polycarboxylic groups or moieties.

When plasticizers having EO/PO groups and/or polycarboxylic groups (or their salts) are mixed into cementitious compositions having certain clay-bearing aggregates (e.g., a clay bearing sand), the plasticizer dosage requirement may sometimes be inconsistent. For example, mixes containing sand from the Southwestern United States, such as CB Rilite sand from Reno, Nev., ("CB") and WMI Placitas sand from Albuquerque, N. Mex. ("WMI"), showed high dosage requirement. The substitution of lab sand (from Kane-Perkins in Milton, N.H.) for either CB Rilite sand or the WMI Placitas sand in a concrete composition was found to have surprisingly reduced the dosage requirement. This performance was confirmed in small-scale concrete and mortar mixtures. That is, the substitution of the Kane-Perkins lab sand for either CB or WMI sand yielded substantially higher flow and slump values at the same EO/PO plasticizer dosage rates.

After analyzing the CB and WMI sands, it was found that both sands contained smectite clay. In parallel experiments, it was found that the addition of sodium montmorillonite (a smectite clay) to Kane-Perkins sand yielded mortar with poor fluidity and high dosage requirement. Additional testing of other clays showed that hectorite, another type of smectite clay, also yielded high dosage requirement in mortar, and that kaolinite, a non-smectite clay, did not have an adverse effect on performance. The poor performance observed for mortar or concrete containing ADVA® plasticizer and clay-bearing sands was also demonstrated for other EO/PO plasticizers. It was found for example that another commercially available EO/PO plasticizer, MALIALIM AKM 1511, experienced a similar drastic reduction in fluidity in mortar containing smectite clay. Based on this data and previous testing, it was concluded that the negative interactions with smectite clays could be attributed to a range of EO/PO and EO-only plasticizers and was not exclusive to ADVA® brand plasticizers.

After discovering the interactions between smectite clays and EO/PO plasticizers in mortar and concrete, significant efforts were focused on attempting to remedy the problem. Primarily, three different approaches were found to be effective in restoring the effectiveness of EO/PO polymers in mortar or concrete containing smectite clays.

First, the addition of agents operative to reduce EO/PO absorbing capabilities of clay contained in clay-bearing aggregate, which agents were added to mortar mixtures before the addition of plasticizer, effectively improved the performance of mortars containing smectite clays and ADVA® plasticizer. Where the agent comprised a glycol, such as polyethylene glycol ("PEG"), it was seen that the higher molecular weight PEG's yielded a significant improvement in mortar flow. The use of glycol containing both ethylene oxide and propylene glycol was also found to be effective in improving mortar flow. Thus, it was demonstrated that both EO and EO/PO materials can be used partially to restore mortar performance. In either case, it is likely that these compounds are being absorbed on the clay surface, thus satisfying some of the clay's affinity for polymer absorption, and, in essence, acting in the manner of a sacrificial component.

A second approach found to be extremely effective was the restoration of EO/PO plasticizer dosage efficiency through the alteration of mortar or concrete mixing procedures. In particular, it was found that the order of addition of materials into a mixer could have a profound effect on performance of mortar or concrete containing an EO/PO superplasticizer (e.g., ADVA® superplasticizer) and clay-bearing sand. It was found that by delaying the addition of clay-bearing sand (until after all other materials have been added), the dosage efficiency of ADVA® superplasticizer could be restored. Furthermore, it was found that only a small portion of cement is needed initially to trigger this effect. The essential element of this discovery is that cement (in some amount) should be present in the mixture prior to or at the same time as the clay-bearing sand comes in contact with mixing water. If this order of addition can be assured, the dosage efficiency of EO/PO superplasticizers in mortar or concrete can be significantly improved, regardless of the presence of smectite clays.

It was also discovered that by changing the order of addition during mixing that the overall water demand of mortar (regardless of superplasticizer) can be reduced. Therefore, when treating mortar containing conventional naphthalene/formaldehyde condensate plasticizer identically to mortar containing ADVA® superplasticizer, the performance of each mixture can be improved. If this modified mixing method is used for both of the above mortars (each containing 0.6% clay), the new dosage efficiency can be improved. When lower clay dosages are used, the dosage efficiency can be increased. It was also observed that mortar (with clay-bearing sand) containing no superplasticizer can be improved using the modified mixing method, that is the fluidity of a reference mortar can also be improved with this mixing technique.

Finally, a promising approach was found to be the addition of soluble calcium salts (preferably calcium nitrate) prior to the introduction of clay-bearing sand. It was shown that the dosage response of EO/PO superplasticizer can be restored with this approach. It was further found that the addition of calcium nitrate directly to clay-bearing sand was more effective than adding calcium nitrate to mix water. It is further believed that soluble potassium salts may also be suitable for the invention.

When studying the behavior of an extremely poor quality sand containing smectite (from Reno), it was found that changing the order of addition of materials was not in itself sufficient to remedy the poor performance of mortar containing ADVA® superplasticizer. Additional work showed that for cases such as this poor quality sand, it is sometimes necessary to combine the previously described three approaches (that is, modified mixing method+polyethylene glycol+calcium nitrate). This combined approach yielded optimal performance and showed a combined synergistic effect. It was further shown that an optimal blend of various molecular weight polyethylene glycols could be determined which yielded the most beneficial flow properties.

Additionally, further exemplary methods of the invention may involve agents which do not preferentially need to be introduced prior to the addition of a plasticizer or the addition of water to the clay. For example, the use of a polyphosphate, such as sodium hexametaphosphate, sodium tripolyphosphate, sodium pyrophosphate, and sodium acid pyrophosphate, or a mixture thereof, does not require a superplasticizer be added after the agent which is intended to reduce the EO and/or PO absorbing capabilities of the clay.

Exemplary clay-activity-modifying agents that are suitable for use in the invention are described in World Patent Application No. PCT/US98/12876, which is incorporated herein by reference, and may be categorized as follows.

Exemplary inorganic multivalent cations which are useful for modifying clay activity include multivalent cations, such as calcium, magnesium, aluminum, iron, or a mixture thereof. Calcium nitrite and calcium nitrate are preferred inorganic cations, as mentioned above, which further may be used with oxyalkylenes such as (poly)ethylene glycol (PEG).

Exemplary clay-activity-modifying agents also include inorganic monovalent cations such as $K^+$, $NH_4^+$, $Cs^+$, $Rb^+$, $Fr^+$, or a mixture thereof. Among these, potassium nitrate is preferred.

Further exemplary clay-activity-modifying agents include organic cations, such as a quaternary amine, (poly)quaternary amine, an amine oxide, or a mixture thereof. The term "organic cation" as used herein refers to any exchange agent (any compound capable of exchanging interlamelar cations associated with 2:1 clays (e.g., smectite) comprising either (a) an organic group bonded to a cationic salt group selected from phosphonium, pyridinium, sulfonium and quaternary ammonium (including poly-quaternary ammonium), or (b) an organic compound containing a single cationic amine salt group and no other amine groups. The organic group bonded to the cationic group of the exchange agents in either category may be a polymeric group. Among the organic cations that may be used in the present invention are amphoteric materials (such as amphoteric surfactants).

Such cations include, but are not limited to, hexadecyltrimethylammonium, methyltriphenylphosphonium, benzyltriphenylphosphonium, and surfactants such as N,N-dimethyl-1-hexadecanamine oxide (commercially available from Akzo Nobel Chemical, Chicago, Ill., under the tradename Aromox® DM-16), and N,N,N',N',N'-pentamethyl-n-tallow-1,3,propanediammonium chloride (commercially available also from Akzo under the tradename Duoquad® T-50). Other exemplary organic cations believed to be useful in the invention include ($C_{12}$-$C_{18}$) fatty amines and amino acids (e.g., lysine). The clay-activity-modifying organic cations are preferably provided in aqueous solution, for safety and low cost. However, in some cases, such as when it is desired to use an organic cation agent in the form of a commercially available organic surfactant, the organic cation agent may be provided in an organic solvent.

A preferred organic cation is a quaternary amine, such as a (poly)quaternary amine in combination with polyethylene glycol (PEG), a combination which facilitated improved EO/PO plasticizer performance that was better than using either the quaternary amine or PEG alone. The use of a quaternary amine having a bonded polyoxyethylene functional group was also found to be more effective than other quaternary amines without bonded polyoxyethylene, particularly when added early in the mixing cycle.

Other exemplary clay-activity-modifying agents include polar organic molecules capable of being absorbed by (smectite type) clays, such as an oxyalkylene (e.g., ethylene and/or propylene glycols such as PEG), a crown ether, a polyvinyl alcohol, a polyacrylic acid, a polymethacrylic acid, a polyacrylate, a polymethacrylate, a gluconate, a glucoheptonate, a glucoheptonic acid, a gluconic acid, a corn syrup, or a mixture thereof. If the polar organic molecule is a polyacrylic acid, a polymethacrylic acid, a polyacrylate, or a polymethacrylate, then the molecular weight should be 2,000 or less. These are preferably added before the EO/PO type plasticizer is introduced to the clay. This may be accomplished by having the clay-activity-modifying agent present before water is added to the clay whereupon the EO/PO type plasticizer is then carried into chemical contact with the clay. It is found that certain clay-activity-modifying agents which have an affinity for clay that is stronger than the EO/PO type plasticizer's affinity for the clay, such as quaternary amines, (e.g., polyquaternary amines), and polyphosphates, may be added simultaneously with the EO/PO plasticizer or before the EO/PO plasticizer is added.

A further exemplary clay-activity-modifying agent comprises clay dispersant selected from the group consisting of a polyphosphate, such as a metaphosphate (e.g., sodium metaphosphate), a tripolyphosphate (e.g., sodium tripolyphosphate), a pyrophosphate (e.g., sodium pyrophosphate, sodium acid pyrophosphate), or a mixture thereof. Still further exemplary methods and admixtures of the invention comprise using a cement dispersant, such as a lignosulfonate, a hydroxylated carboxylate, a carbohydrate, or mixture thereof, in addition to the clay dispersant.

Those skilled in the cement and concrete arts will understand that the amount of clay-activity-modifying agent (whether it be of the cationic, polar organic clay-absorbable molecule, or clay dispersant variety) to be incorporated into the mix will be varied according to the nature of the sand, the amount and nature of the plasticizer to be dosed, the particular addition sequence of components to be used, mixing conditions, and other factors. It is believed that a wide range, such as 0.005% s/s (active solid by percent weight based on solids cement) up to 12% s/s is usable, with a range of about 0.01-10.0% s/s preferred. Again, however, the range is dependent upon the nature of conditions and nature of the mixing operation.

In summary, some of the clay-modifying agents described above have been found to cause poor air entrainment or air quality in fabricated air-entrained concrete. These agents have been found to be of the organic polymer class, and these may cause any number of problems with air entrainment, including, but not limited to, excess defoaming, large air voids, difficult air control, unstable air (air void size and amount can change), and inconsistent air entrainment (performance varies from batch to batch).

As previously summarized, an exemplary surface active agent combination of the present invention has a first component selected from betaines, alkyl and/or alkylaryl sulfonates, or a mixture thereof. Of these, the betaines are most preferred and are believed to be the most effective in maintaining air void content in the 4-8% volume range (based on volume of wet concrete).

Accordingly, an exemplary betaine surfactant useful in the present invention has the following formula

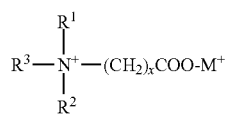

wherein $R^1$, $R^2$, and $R^3$ are independently alkyl groups or alkyl containing moieties, x is 1 to 5, and M is a metal cation, or ammonium. Preferably, M is sodium. Suitable metal cations are derived from any of the alkali, e.g., sodium or alkaline earth metals. Ammonium salts also are suitable. The compounds of this invention are typically added as metal salts.

Preferably, $R^1$ and $R^2$ are $C_1$-$C_4$ alkyl groups, and most preferably methyl groups. Preferable alkyl groups for $R^3$ are $C_{10}$-$C_{28}$ and include alkyl-containing moieties such as alkylamides, alkyl amido alkylenes, and substituted alkyls such as hydroxyalkyls. It is particularly preferred that $R^3$ is a $C_{10}$-$C_{20}$ alkylamido propyl, such as lauramido propyl and cocoamidopropyl. Other suitable betaines are listed in U.S. Pat. No. 5,679,150, the specification of which is incorporated fully herein by reference.

Another suitable type of betaine, a sulfobetaine, has the general formula

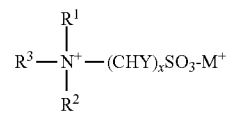

wherein $R^1$, $R^2$, and $R^3$ are independently alkyls or alkyl containing moieties, x is an integer of 1 to 5, M is a metal cation, and Y is hydrogen or a hydroxyl group. A preferred sulfobetaine is cocoamido propyl hydroxy sultaine.

Other suitable betaines and sulfobetaines are disclosed in U.S. Pat. No. 4,209,337, the entire content of which is incorporated herein by reference. Methods for preparing betaines and sulfobetaines are known in the art. See U.S. Pat. No. 5,679,150 and references cited therein. As will be shown in the Examples which follow this section, the betaine is used to incorporate large amounts of air using very small dosages. However, the present inventors discovered that the second surface active agent was useful for adjusting and stabilizing the air void system, as previously explained.

The first surface active agent may alternatively comprise, as previously mentioned, an alkyl or alkylaryl sulfonate, such as sodium dodecylbenzene sulfonate, or other alkali metal salt (e.g., potassium, ammonium).

In addition to the first surface active agent mentioned above, the exemplary admixture composition of the invention comprises a second surface active agent. Preferably, the second surface active agent is a nonionic oxyalkylene polymer (preferably, a block copolymer) surfactant. Exemplary oxyalkylene polymer surfactants are represented by one of the following formulae designated as "A" through "D" as follows:

(Formula A)
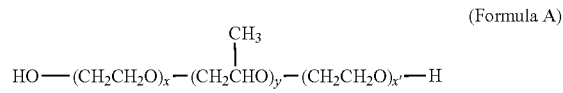

wherein x and x' independently represent an integer of from 1 to 140, more preferably from 1-11, and most preferably from 1-4; and y represents an integer of from 15-70, more preferably from 15-63, and most preferably from 15-42;

(Formula B)
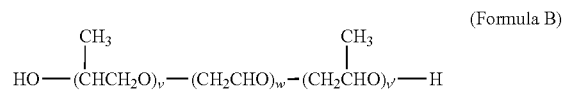

wherein v and v' independently represent an integer of from 9 to 27, more preferably 15-27, and most preferably 20-27; and w represents an integer of from 4 to 232, more preferably 4-18, and most preferably from 4-7;

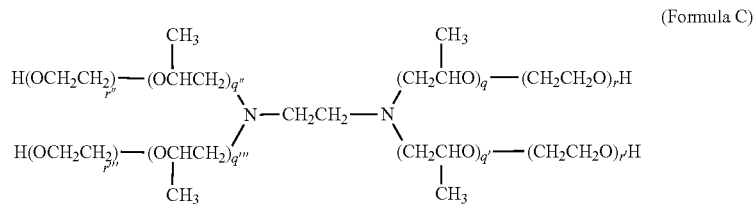
(Formula C)

wherein q, q', q", and q'" independently represent an integer of from 4 to 31, more preferably 13 to 31, and most preferably 13-27; and r, r', r", and r'" independently represent an integer of from 2 to 140, more preferably 2 to 11, and most preferably 2 to 4; and

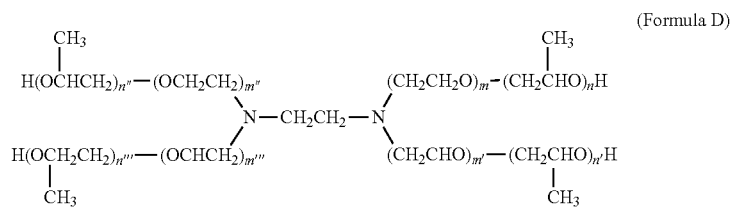
(Formula D)

wherein m, m', m", and m'" independently represent an integer of from 1 to 95, more preferably 1 to 91, and most preferably 1 to 4; and n, n', n", and n'" independently represent an integer of from 8 to 32, more preferably 8 to 24, and most preferably 8 to 21.

For the foregoing formulae, it is preferred to have an EO/PO ratio (e.g., ethylene oxide:propylene oxide ratio) in the range of 0.1-0.2, with a more preferred ratio of about 0.11.

Suitable nonionic oxyalkylene polymer surfactants are commercially available from BASF under the tradenames PLURONIC® and TETRONIC®. Preferred polymer surfactants have an average total molecular weight in the range of 1000 to 4500, and are more preferably block copolymers. It is believed that PLURONIC® L81, L31, and L61 fall within this preferred molecular weight range and provide good results.

Thus, an exemplary surface active agent combination of the present invention comprises (1) a first surface active agent, such as a betaine (e.g., Chembetaine C which is a cocoamidopropyl betaine commercially available from Chemron Corporation of Paso Rables, Calif., which should be used in the following dosage range of 0.0001-0.005% (more preferably 0.0002-0.002%, and most preferably 0.0002-0.001%) s/s by weight of cement; and (2) a nonionic oxyalkylene polymer (e.g., PLURONIC® L81) in the range of 0.0001-0.005% (more preferably 0.0001-0.001%) s/s by weight of cement. When combined with on or more plasticizers and one or more clay-activity agents, an exemplary surface active agent composition of the invention can be formulated, in accordance with the following dosage rates, as presented in Table 1 below:

TABLE 1

Dosage Ranges (% solids by wt of cement)

| Admixture | Composition | Broad | Preferred | Most Preferred |
|---|---|---|---|---|
| Plasticizer | EO/PO type | 0.02-0.30 | 0.04-0.24 | 0.06-0.10 |
| Clay-Activity Modifier | Sodium Gluconate | 0.01-0.15 | 0.01-0.06 | 0.03-0.05 |
| Clay-Activity Modifier | JEFFOX® WL5000 | 0.01-0.50 | 0.01-0.20 | 0.02-0.12 |
| First Surface Active Agent | Chembetaine C | 0.0001-0.005 | 0.0002-0.002 | 0.0002-0.001 |
| Second Surface Active Agent | PLURONIC® L81 | 0.0001-0.005 | 0.0001-0.002 | 0.0001-0.001 |

Exemplary surface active agent compositions, containing the two surface active agents and optionally the plasticizer and one or more clay-activity modifying agents, can be formulated as an aqueous composition having the following formulations, based on percentage total dry solids, as presented in Table 2 below.

TABLE 2

| Admixture Composition | | Ranges % solids on solids of admixture | | |
|---|---|---|---|---|
| | | Broad | Preferred | Most Preferred |
| Plasticizer | EO/PO type | 15-95 | 20-80 | 40-60 |
| Clay-Activity Modifier | Sodium Gluconate | 1-15 | 5-30 | 20-30 |
| Clay-Activity Modifier | JEFFOX ® WL 5000 | 1-75 | 5-50 | 15-35 |
| First Surface Active Agent | Chembetaine C | 0.01-5 | 0.05-1 | 0.1-0.6 |
| Second Surface Active Agent | PLURONIC ® L81 | 0.01-5 | 0.05-1 | 0.1-0.6 |
| Total Solids | | 1-45 | 5-35 | 15-30 |

JEFFOX® is the tradename used by Huntsman Chemical Corporation of Houston, Tex., for polyoxyalkylene alcohols.

Further exemplary admixture and concrete compositions of the invention, which comprise the first and second surface active agents as described above, may comprise a conventional admixture. The further admixture may comprise, for example, a water reducer (e.g., plasticizer or superplasticizer), a set accelerator, a set retarder, a shrinkage reducer, a corrosion inhibitor, a strength enhancer, or mixture thereof. The admixture may have an air entraining group or moiety having polycarboxylic acid groups or their salts or esters, oxyalkylene groups, or a mixture thereof. The admixture may also comprise a comb polymer having a carbon containing backbone to which are attached pendant groups comprising polycarboxylic acid groups or their salts or esters; oxyalkylene groups; or a mixture thereof.

An understanding of the invention may be facilitated by the illustrative examples, which follow:

Example 1

In this example, an EO/PO based plasticizer is used in conjunction with clay-modifying agents in the presence of clay-bearing aggregate to produce air-entrained concrete. As illustrated in the example, the higher dose of air entraining agent was required versus the commonly used naphthalene plasticizer.

Air entrained concrete mixes were fabricated in accordance with the following proportions: Type I/II Portland cement in the amount of 660 lb/yd$^3$; water in the amount of 250 lb/yd$^3$; coarse aggregate (crushed stone) in the amount of 1700 lb/yd$^3$; and fine aggregate in the amount of 1435 lb/yd$^3$. The sand was dosed with 0.34% sodium montmorillonite clay (marketed as POLARGEL™ NF by American Colloid, Belle Fourche, S. Dak.) to simulate the performance of clay-bearing sands as illustrated in a similar manner in World Patent Application number PCT/US98/12876.

A conventional air-entraining agent (DARAVAIR® 1000 from Grace Construction Products, Cambridge, Mass.) was added at a dosage required to bring the plastic air content within the range of 5-9% by total volume of wet concrete. The mix sequence employed was as follows: sand, clay and stone were pre-mixed in a 3 ft$^3$ laboratory concrete mixer for approximately 30 seconds. The air-entraining agent was added and mixed for another 30 seconds. The water was split into two fractions and added to the mixer over the course of 15 seconds for each portion, followed by 1 minute of mixing. The cement was then added, followed by mixing for 1 minute. The plasticizer was then added and the concrete was mixed for another two minutes. The mixer was then stopped. After 3 minutes rest, the mixer was restarted for another two minutes of mixing, after which time the resultant concrete mix was loaded into a container for testing.

Air content was tested in accordance with ASTM C231-97. Other concrete properties such as slump, strength, and set time were tested to confirm that the concrete was in a reasonable range for experimental purposes.

The plasticizers illustrated in this example include naphthalene sulfonate formaldehyde condensate plasticizer (hereinbelow designated as "NSFC") and an EO/PO based plasticizer. It was discovered in World Patent Application number PCT/US98/12876 that in the presence of clay-bearing aggregate, clay-modifying agents are required to attain a desirable EO/PO-based plasticizer dosage requirement. Therefore, the EO/PO based plasticizer blend (hereinbelow designated "EO/PO blend") comprises, on a solids basis, 4 parts EO/PO plasticizer available from Grace Construction Products, Cambridge, Mass., and two clay modifying agents: 3 parts JEFFOX® WL 5000 (a polyester alcohol commercially available from Huntsman Chemical Corporation, Houston, Tex.) and 2 parts sodium gluconate.

The purpose of the experiment was to determine the amount of air entraining agent required for the aforementioned concrete mix containing "EO/PO blend" to obtain an equivalent plastic air volume as a concrete prepared with NSFC. The plasticizer dosage was used to obtain a slump of 5-8 inches. Air-entraining agent dosage was determined by adding in air entraining agent until the plastic air content was in the range of 5-9%.

TABLE 3

| Mix# | Plasticizer | Admixture Dosage (% s/s) | Plastic Air Content, % | DARAVAIR ® 1000 Dosage (oz/cwt) |
|---|---|---|---|---|
| 1 | NSFC | 0.37 | 8.8 | 0.7 |
| 2 | EO/PO Blend | 0.18 | 8.3 | 1.2 |

The results in Table 3 indicate that almost 50% more air entraining agent was required to prepare concrete containing "EO/PO blend" (from mix #2) with a similar plastic air content as concrete with NSFC (from mix #1).

Based on the requirement of a larger dosage of air-entraining agent, the "EO/PO blend" is considerably less desirable for the conventional practice of air-entrained concrete. As illustrated later in the example 3, this problem is overcome by the use of the "air adjuster" surfactant, Chembetaine.

Example 2

This example illustrates that the concrete made with the "EO/PO blend" in the presence of clay modifying-agents has a poor air void quality with an undesirably large spacing factor and an insufficient specific surface. The concrete with such properties often does not provide the proper freeze thaw durability for concrete.

Concrete was fabricated in the same manner described above in Example 1 with the exception of a different mix design and the amounts of the doped clay. The concrete was mixed in accordance with the following proportions: Type I/II Portland cement in the amount of 520 lb/yd$^3$; water in the amount of 255 lb/yd$^3$; coarse aggregate (crushed stone) in the amount of 1860 lb/yd$^3$; and fine aggregate in the amount of 1387 lb/yd$^3$. The sand was dosed with 0.20% sodium montmorillonite clay (POLARGEL™ NF).

The air entraining agent, DARAVAIR® 1000, was used in the same manner as in Example 1. Air content and other concrete properties were tested in the identical manner as described previously in Example 1. In addition, the air void quality of the hardened concrete was tested in accordance with ASTM C457-98.

The results of this experiment are summarized in Table 3:

TABLE 3

| Mix# | 3 |
| --- | --- |
| Plasticizer | EO/PO Blend |
| Admixture Dosage(% s/s) | 0.18 |
| DARAVAIR ® 1000 Dosage (oz/cwt) | 0.75 |
| Plastic Air Content, % | 5.3 |
| Hardened Air Content, % | 3.5 |
| Spacing Factor, inches | 0.0159 |
| Specific Surface, (1/inch) | 330 |

The results in Table 3 showed that concrete with the "EO/PO blend" experienced a 1.8% drop in air content from 5.3% (plastic air) to 3.5% (hardened air). For concrete mixed at room temperature, a drop of less than 1% is preferred. Moreover, the spacing factor and specific surface were 0.0159 inches and 330 1/inch, respectively. The recommended values to pass the ASTM C494 criteria for freeze/thaw durability is <0.008 inches for the spacing factor and >600 1/inch for the specific surface. High quality air, which passes the requirement in ACI 201. 2R, Section 1.2.3 "Freezing and Thawing—Overall Effects in Concrete" is considered to be essential for a freeze/thaw durable concrete. Based on the results, the concrete made with the "EO/PO blend" does not meet requirements for an air void system that will demonstrate freeze-thaw durability.

As illustrated later in the examples 4, 5 and 6, this problem was solved by the use of the second defoaming non-ionic surfactant in conjunction with the first "air adjuster" surfactant.

Example 3

The purpose of this experiment in the example 3 was to illustrate the use of a first surface-active agent, Chembetaine C, to provide rapid adjustments of the air in the concrete by using small dosages of the surface-active agent. The benefit of allowing air to be entrained more easily is a decrease in air-entraining agent dosage.

Chembetaine C was blended together with "EO/PO blend" at dosages of 0.001%, 0.002%, and 0.004% s/s. The "EO/PO blend" was kept at a constant dosage of 0.18% s/s for all mixes. Concrete mixes were made using the resulting blends in the same manner described above in Example 1. Daravair 1000 was added at a dosage rate of 1.1 oz/cwt. Table 4 summarizes the effect of adding Chembetaine C to the concrete mixes in increasing dosage.

TABLE 4

| Mix # | Chembetaine C dosage (% s/s) | Plastic air content |
| --- | --- | --- |
| 4 | 0.001 | 8.7% |
| 5 | 0.002 | 15% |
| 6 | 0.004 | 19% |

As shown in Table 4, Chembetaine C is a potent surface-active agent for increasing the plastic air content of concrete in the presence of conventional AEA. The dosage of Chembetaine C required to allow the plastic air content to increase to 15% is only 0.002% s/s. In comparison to the 0.18% s/s dosage of the "EO/PO blend", the dosage of Chembetaine C required is very small. By using very small dosages of a surface-active agent such as Chembetaine C, air content can be increased drastically, leading to a decreased requirement for air-entraining agent.

Experimentation was performed to determine the amount of air entraining agent required to produce and maintain a desirable air content of 6-8% (by volume) within a concrete mix using different dosages of Chembetaine C. Chembetaine C was blended with the "EO/PO blend" in the same manner as described early in this Example. The concrete mix was the same as that described in Example 1. The "EO/PO blend" dosage was constant for all mixes at 0.18% s/s based on cement. For all mixes, the air-entraining agent used was DARAVAIR® 1000.

The results graphically illustrated in FIG. 1 demonstrate a trend. The trend is for the required dose of a conventional air-entraining agent (DARAVAIR® 1000) to be reduced, as the Chembetaine C dosage level is increased, while concrete mixtures having 6-8 percent air are produced.

The graph shown in FIG. 1 illustrates how a formulation utilizing Chembetaine C can be more easily adjust the air content. If, for example, one desired to use an air entraining agent (DARAVAIR® 1000) at a conventional dose of 0.3 oz/cwt in order to entrain a desired air content of 6-8%, according to the chart, one would need to employ a Chembetaine C dosage of 0.001%. In comparison, 1.2 oz/cwt of air-entraining agent was required in the absence of Chembetaine C as illustrated in Example 1.

Thus a first surfactant, Chembetaine C, is found to reduce the air entrainer dosage level to an acceptable amount. However, the concrete so obtained demonstrated poor air void stability, in that a plurality of bursting air bubbles are seen on the surface of the fresh concrete.

Example 4

This example exemplifies the preferred embodiment of using the second surface-active agent, a non-ionic polymer surfactant, to improve the quality of the air void system. In addition, this example illustrates the effect of using surface-active agents of different molecular weights and their effect on the quality of the air void system. Several species of nonionic polymer surface-active agents (commercially available as PLURONIC® surfactants from BASF Corporation) of varying molecular weight were tested. The experimentation was performed in the same manner as the procedure in Example 1. The entrained air content was maintained in the range of 6-8% for all of the mixes.

Figure 2:
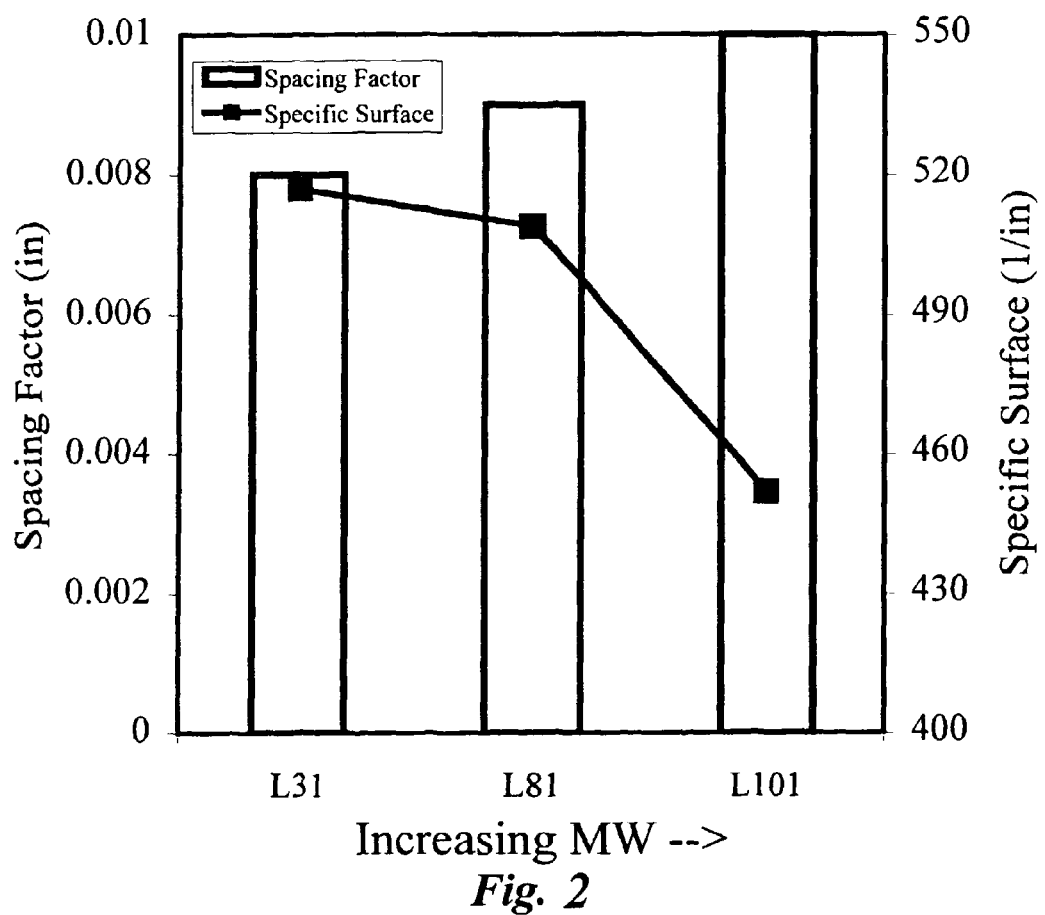

The results of the experimentation were plotted in the graph shown in FIG. 2. The graph illustrates the effect of increasing molecular weight of the surface-active agents with the lowest molecular weight towards the left. The three species, Pluronic L31, L81 and L101 had approximate molecular weights of 1100, 2750, and 3800 respectively.

All three Pluronic surface active agents tested produced concrete which had an improved air void system. However, as shown in FIG. 2, increasing the molecular weight caused the "spacing factor" to increase. The "spacing factor", as indicated by the bar graph in FIG. 2, is a measure of the spacing between the air voids; therefore, a lower value is more desirable. Pluronic L31, having the lowest molecular weight, was associated with the best spacing factor. Pluronic L31 also had the smallest air voids as indicated by the "specific surface" factor (Line in FIG. 2). "Specific surface" is a measure of the surface area of the air voids where a higher value is more desirable. Therefore, the surface-active agent having the lowest molecular weight produced the most desirable air void system.

Example 5

In addition to molecular weight, the EO/PO ratio of the second surface-active agent is another property of the polymers which has an effect on the air properties of the concrete to which they are added. In this example, three non-ionic polymers of the Pluronic series of varying EO/PO ratio were tested to determine the effect of EO/PO ratio on the plastic air content of concrete. The most desirable effect is to obtain a "defoaming" effect. "Defoaming" is the property of a surface active agent to either produce a lower air content or increase the dosage of air-entraining agent required to obtain a certain plastic air content. The purpose of using a "defoaming" surface active agent is to offset the air entraining effect of Chembetaine C to produce a more stable, and more easily adjustable, surface-active agent combination.

The procedure employed was similar to that used in Example 4, with the dosage of the conventional AEA (DARAVAIR® 1000) being fixed at 0.3 oz/cwt for the PLURONIC surfactants having higher EO/PO contents. However, the dosage of the AEA was 0.4 oz/cwt for PLURONIC L81 surfactant in order to bring the air content of the concrete within the range of 6-8%. All of the surface-active agents were dosed at 0.0005% s/s. The results of the experiments are presented in Table 5.

TABLE 5

| Mix # | PLURONIC ® Species | EO/PO ratio | Plastic air content |
|---|---|---|---|
| 7 | PLURONIC ® L81 | 0.11 | 6.4%* |
| 8 | PLURONIC ® F87 | 2.33 | 7.0% |
| 9 | PLURONIC ® F88 | 4.00 | 7.9% |

*Mix contained more AEA at 0.4 oz/cwt

The results indicated that plastic air content increases with increasing EO/PO ratio. Pluronic L81, in mix #6, had the lowest EO/PO ratio at 0.11 and experienced the lowest plastic air content. It meets the criteria of being potent at small dosages as evident by being able to achieve the "defoaming" effect at a very low dosage of 0.0005% relative to the 0.18% s/s dosage for the "EO/PO" blend. Therefore, in this test, Pluronic L81 is the most desirable second surface-active agent to be used in combination with the first surface-active agent, Chembetaine C, to produce a surface-active agent combination that allows for adjustable and controllable air and a stable air void system.

Example 6

Large scale concrete manufacturing conditions (in Dallas, Tex.) were used to further test the effectiveness of the EO/PO blend utilizing the combination of the surface active agents Chembetaine C and Pluronic L81 in comparison to NSFC. The concrete mix design and materials are specified in Table 6 for a batch size of 8 yd³. Upon investigation of these materials, the fine aggregate (sand) was determined to bear amounts of smectite clay. The presence of the clay warranted usage of clay modifying agents. To satisfy the need to entrain air, properly, adding the surface-active agents outlined above was found to be necessary. The formulation of the "EO/PO blend" with the two surface-active agents (hereinbelow designated as "EO/PO air blend") was prepared to such that when dosed, the concrete mix contains 0.18% s/s "EO/PO blend", 0.0005% s/s Chembetaine C and 0.0002% s/s Pluronic L81. The dosage of NSFC used was 0.37% s/s for all experiments with no surface active agent. The mix proportions for the base concrete for the cited example are reported in Table 6:

TABLE 6

| Component in Base Concrete | Amount |
|---|---|
| Type I Portland Cement | 526 lb/yd³ |
| Class F Fly ash | 132 lb/yd³ |
| Sand | 1025 lb/yd³ |
| 1" Crushed Limestone | 1870 lb/yd³ |
| Water | 276 lb/yd³ |
| WRDA ® HYCOL Water Reducing Agent | 3 oz/cwt |
| DARAVAIR ® 1000 | 1 oz/cwt |

The plasticizer was added directly to the truck after the concrete was loaded and mixed for approximately 5 minutes. After another 5 minutes of mixing, the air content was determined according to the procedure in ASTM C237 and the other concrete properties were measured according to ASTM procedures. Samples were collected for hardened air analysis. At the end of the testing, the concrete was placed into forms and "finished". Concrete that is "finished" has gone through the final stages of placement including smoothing out the surface and removal of excess water. The term "finishability" refers to the difficulty or ease of concrete to be "finished". In response to concerns of the "finishability" of concrete containing an EO/PO based plasticizer being difficult, the ease of "finishability" was observed qualitatively. The results of the testing are found in the following tables. The truck was set on a slower rotation of 2 rpm. After approximately 30 minutes, the same concrete properties were again determined and more samples collected. In order to maintain the air properties as the only variable, the other concrete properties were ensured to be within a consistent and reasonable range.

Table 7 displays the results of air content testing. Given in Table 7 are the initial air content and the change in the air content 30 minutes after plasticizer addition.

TABLE 7

| Mix # | Plasticizer | Initial Plastic Air Content | Final Plastic Air Content | Air change at 30 min |
|---|---|---|---|---|
| 10 | NSFC | 6.2% | 2.8% | −3.4% |
| 11 | NSFC | 4.1% | 3.4% | −0.7% |
| 12 | EO/PO air blend | 5.0% | 4.3% | −0.7% |
| 13 | EO/PO air blend | 5.3% | 4.8% | −0.5% |
| 14 | EO/PO air blend | 5.8% | 4.0% | −1.8% |

"NSFC" is considered the benchmark for which the "EO/PO air blend" to be compared. Based on these results, the concrete dosed with the EO/PO air blend plasticizer in mixes 12, 13 and 14 was able to achieve an air content in the range of 4-6% which is similar to the range of air content obtained with "NSFC" in mixes 10 and 11. In addition, the "EO/PO air blend" plasticizer was found to be superior to NSFC in terms of air stability, as demonstrated by a smaller change in air content over time. "NSFC" also experienced a larger variability between mixes by having an air content range of 4.1-6.2%. In comparison, the "EO/PO air blend" maintained an air content within 5-5.8%, a range which is more favorable in terms of the consistency between mixes.

ASTM C457-98 hardened air analysis was used to determine the amount and the quality of the air void system. Desirable properties include consistent plastic and hardened air contents, small air void size (large specific surface) and closely spaced voids (small spacing factor). Table 8 contains the hardened air analysis for Mix #11, the concrete with NSFC plasticizer, and Mix #13 that contained the "EO/PO air blend." For both mixes, samples taken at the initial time and the 30-minute time points were analyzed in order to assess the change in air void properties over time. Ideally, the concrete should maintain the same air properties for at least 30 minutes or until the concrete mix, handling, and placement are completed.

TABLE 8

| Mix# | Plasticizer | Change in Air Content from Plastic to the Hardened State (%) | | Specific Surface (1/in) | | Spacing Factor (in) | |
|---|---|---|---|---|---|---|---|
| | | Initial | 30 min | Initial | 30 min | Initial | 30 min |
| 11 | NSFC | −0.5 | −0.4 | 1045 | 905 | 0.0053 | 0.0067 |
| 13 | EO/PO air blend | −0.4 | +0.1 | 838 | 896 | 0.0058 | 0.0054 |

Mix #11 in Table 8 represents the air void properties with concrete containing "NSFC." The drop in air content from the plastic to hardened state was low at 0.5%. The spacing factor and specific surface were of sufficient value to warrant a high quality air void system. In addition, there was little change in air void system quality from the initial reading and after 30 minutes indicating that the air void system quality was stable over time even though the air content was not. The concrete mixed with the "EO/PO air blend" followed a slightly opposite trend to that for NSFC. Moreover, all the measured air void systems are well within the guidelines for freeze-thaw durable concrete.

The observation of the finishability of the mixes was favorable. The concrete was visibly smoother on its outer surface, and was qualitatively easier to work using a trowel. Previously, concrete fabricated with an EO/PO based plasticizer was found to have poor finishability due to stickiness on the surface of the concrete. The concrete fabricated in Mixes #8, #9, and #10 containing the EO/PO air blend experienced a good finishability despite the presence of the EO/PO based plasticizer in the EO/PO air blend. Accordingly, it is believed that the use of the two surface active agents increased finishability. A method of the invention for improving finishability therefore involves incorporating the two surface active agents into a wet hydratable cementitious mixture.

The foregoing examples and embodiments are provided for illustrative purposes only and not intended to limit the scope of the invention.

The invention claimed is:

1. A hydratable cementitious composition containing a cementitious binder and an admixture composition, said admixture composition comprising: a plasticizer for modifying a cementitious composition; a first surface active agent comprising a betaine, an alkyl sulfonate, an aryl sulfonate, an alkylaryl sulfonate, or a mixture thereof; and a second surface active agent comprising a nonionic oxyalkylene-containing polymer surfactant represented by at least one of the formulae "A" through "D":

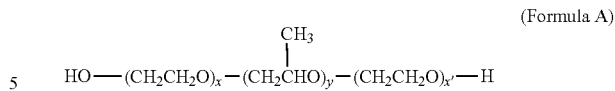

wherein x and x' independently represent an integer of from 1 to 140; and y represents an integer of from 15-70;

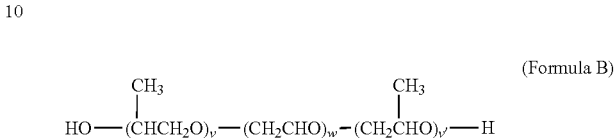

wherein v and v' independently represent an integer of from 9 to 27; and w represents an integer of from 4 to 232;

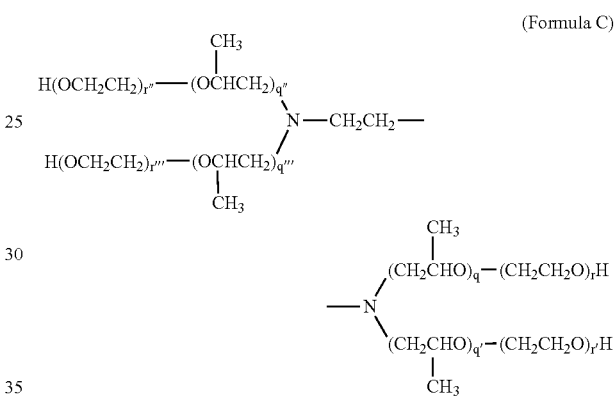

wherein q, q', q", and q'" independently represent an integer of from 4 to 31; and r, r', r", and r'" independently represent an integer of from 2 to 140; and

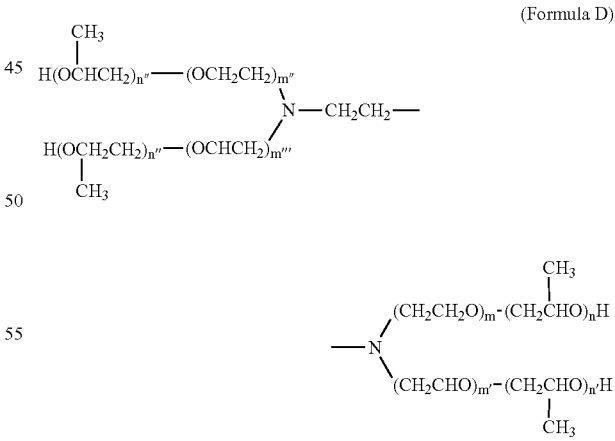

wherein m, m', m", and m'" independently represent an integer of from 1 to 95; and n, n', n", and n'" independently represent an integer of from 8 to 32.

2. The hydratable cementitious composition of claim 1 wherein said first surface active agent is a betaine represented by the formula

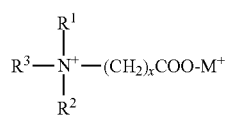

wherein $R^1$, $R^2$, and $R^3$ are independently alkyl groups or alkyl containing moieties; x is 1 to 5; and M is a metal cation, or ammonium.

3. The hydratable cementitious composition of claim 2 wherein, in said betaine formula, said metal cation is sodium.

4. The hydratable cementitious composition of claim 2 wherein said betaine is in the form of a metal salt.

5. The hydratable cementitious composition of claim 2 wherein, in said betaine, $R^1$ and $R^2$ represent C1-C4 alkyl groups and $R^3$ represents a $C_{10}$-$C_{28}$ alkyl group or $C_{10}$-$C_{28}$ alkyl-containing moiety.

6. The hydratable cementitious composition of claim 2 wherein, in said betaine, $R^3$ represents a $C_{10}$-$C_{20}$ alkylamido propyl group.

7. The hydratable cementitious composition of claim 6 wherein said betaine is cocoamido propyl betaine.

8. The hydratable cementitious composition of claim 1 wherein said betaine is a sulfobetaine having the general formula

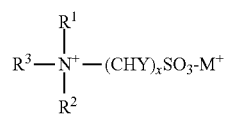

wherein $R^1$, $R^2$, and $R^3$ are independently alkyls or alkyl containing moieties, x is an integer of 1 to 5, M is a metal cation, and Y is hydrogen or a hydroxyl group.

9. The hydratable cementitious composition of claim 8 wherein said sulfobetaine is cocoamido propyl hydroxy sultaine.

10. The hydratable cementitious composition of claim 9 wherein said ethylene oxide (EO) and propylene oxide (PO) groups are in an EO/PO ratio of 0.1 to 0.2.

11. The hydratable cementitious composition of claim 1 wherein said nonionic oxyalkylene polymer surfactant is represented by Formula A.

12. The hydratable cementitious composition of claim 1 further comprising, in addition to said plasticizer, at least one other admixture comprising a water reducer, a set accelerator, a set retarder, a shrinkage reducer, a corrosion inhibitor, a strength enhancer, or mixture thereof.

13. The hydratable cementitious composition of claim 12 wherein said plasticizer or other admixture comprises an air entraining group or moiety having polycarboxylic acid groups or their salts or esters, oxyalkylene groups, or a mixture thereof.

14. The hydratable cementitious composition of claim 13 wherein said plasticizer or other admixture comprises a comb polymer having a carbon containing backbone to which are attached pendant groups comprising polycarboxylic acid groups or their salts or esters; oxyalkylene groups; or a mixture thereof.

15. The hydratable cementitious composition of claim 1 further comprising at least one clay activity-modifying agent.

16. The hydratable cementitious composition of claim 15 wherein said at least one clay activity-modifying agent comprises a gluconate, a polyoxyalkylene alcohol, or mixture thereof.

17. The hydratable cementitious composition composition of claim 1 wherein said first surface active agent comprises a betaine; and said admixture composition comprises a plasticizer or other admixture comprising a polycarboxylic acid group or its salt or ester, and at least one clay activity-modifying agent.

18. The hydratable cementitious composition of claim 1 further comprising at least one air entraining agent.

19. The hydratable cementitious composition of claim 18 wherein said air entraining agent is selected from the group consisting of water soluble salts of wood resins, wood rosins, lignosulfonic acid, sulfonated hydrocarbons, proteinaceous materials, fatty acids and their esters, non-ionic surfactants, sulfonated hydrocarbons, and proteinaceous materials.

20. The hydratable cementitious composition of claim 18 wherein said air entraining agent comprises tall oil fatty acid.

21. The hydratable cementitious composition of claim 1 further comprising at least one aggregate comprising fine aggregate, coarse aggregate, or mixture thereof; said cementitious composition, when combined with water and allowed to harden, having a uniformly distributed air void system having (A) a spacing factor less than 0.008 inch as measured in accordance with ASTM C457-98, and (B) a specific surface greater than 600 (1/inch) as measured in accordance with ASTM C457-98.

* * * * *